(12) United States Patent
Moisin

(10) Patent No.: US 6,281,638 B1
(45) Date of Patent: *Aug. 28, 2001

(54) CONVERTER/INVERTER FULL BRIDGE BALLAST CIRCUIT

(75) Inventor: Mihail S. Moisin, Brookline, MA (US)

(73) Assignee: Electro-Mag International, Inc., N. Scituate, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,543

(22) Filed: Jan. 28, 2000

Related U.S. Application Data

(63) Continuation of application No. 08/948,690, filed on Oct. 10, 1997, now Pat. No. 6,020,688.

(51) Int. Cl.$^7$ .................................................. H05B 37/00
(52) U.S. Cl. .............. 315/244; 315/209 R; 315/209 CD; 315/224; 315/307
(58) Field of Search ............................... 315/244, 209 R, 315/224, 209 T, 209 CD, 276, 283, 291, 307, 297; 363/65, 68, 69

(56) References Cited

U.S. PATENT DOCUMENTS

| | | | |
|---|---|---|---|
| 3,808,481 | 4/1974 | Rippel | 318/139 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 307/31 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 R |

(List continued on next page.)

FOREIGN PATENT DOCUMENTS

| | | | |
|---|---|---|---|
| 4010435 | 10/1991 | (DE) . | |
| 40 32 664 A 1 | 4/1992 | (DE) . | |
| 196 39 857 A | 4/1997 | (DE) | H02M/7/48 |
| 0 440 245 A2 | 8/1991 | (EP) | H02M/5/458 |
| 0460641 | 12/1991 | (EP) . | |
| 0522266 | 1/1993 | (EP) . | |
| 2 204 455 A1 | 11/1988 | (GB) | H02M/3/00 |
| 01185132 | 7/1989 | (JP) | H02M/9/08 |
| WO 94/22209 | 9/1994 | (WO) | H02M/5/00 |
| 9535646 | 12/1995 | (WO) . | |

OTHER PUBLICATIONS

"Simple Dimming Circuit for Fluorescent Lamp", IBM Technical Disclosure Bulletin, vol. 34, No. 4A, Sep. 1, 1991, pp. 109–111, XP000210848.

Marian Kazimierczuk et al., "Resonant Power Converters", 1995, pp. 332–333.

The Electronics Handbook; Jerry C. Whitaker: Editor–in–Chief; Technical Press, Inc.; Beaverton, OR, IEEE; 1996 pp. 977–978, 983.

Primary Examiner—Don Wong
Assistant Examiner—Thuy Vinh Tran
(74) Attorney, Agent, or Firm—Nutter, McClennen & Fish, LLP

(57) ABSTRACT

A circuit for driving a load. In one embodiment, the load is driven by an inverter circuit having a full bridge circuit divided by inductive elements to provide cross conduction protection. In another embodiment, first and second converter circuits are coupled to the inverter circuit with the inverter and converter circuits having common circuit elements. In a further embodiment, a common mode inducter is inductively coupled to a power circuit for detecting a common mode signal generated by a load current return path disruption. The common mode inductor is coupled to a control circuit for limiting current to the load.

8 Claims, 13 Drawing Sheets

U.S. PATENT DOCUMENTS

| | | | |
|---|---|---|---|
| 4,608,958 | 9/1986 | Sakakibara et al. | 123/605 |
| 4,618,810 | 10/1986 | Hagerman et al. | 318/803 |
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/224 |
| 5,052,039 | 9/1991 | Moisin | 379/402 |
| 5,063,339 | 11/1991 | Orii et al. | 318/696 |
| 5,081,401 | 1/1992 | Moisin | 315/324 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 R |
| 5,138,236 | 8/1992 | Bobel et al. | 315/209 R |
| 5,144,195 | 9/1992 | Konopka et al. | 315/94 |
| 5,148,087 | 9/1992 | Moisin et al. | 315/291 |
| 5,177,408 | 1/1993 | Marques | 315/291 |
| 5,191,263 | 3/1993 | Konopka | 315/209 R |
| 5,216,332 | 6/1993 | Nilssen | 315/224 |
| 5,220,247 | 6/1993 | Moisin | 315/209 R |
| 5,223,767 | 6/1993 | Kulka | 315/209 R |
| 5,256,939 | 10/1993 | Nilssen | 315/244 |
| 5,291,382 | 3/1994 | Cohen | 363/56 |
| 5,309,066 | 5/1994 | Ditlevsen | 315/205 |
| 5,313,143 | 5/1994 | Vila-Masot et al. | 315/209 R |
| 5,315,533 | 5/1994 | Stich et al. | 364/480 |
| 5,332,951 | 7/1994 | Chandrasekaran | 315/291 |
| 5,334,912 | 8/1994 | Counts | 315/119 |
| 5,345,374 | 9/1994 | Sato et al. | 363/24 |
| 5,390,231 | 2/1995 | Hung et al. | 379/2 |
| 5,399,943 | 3/1995 | Chandrasekaran | 315/219 |
| 5,416,388 | 5/1995 | Shackle | 315/219 |
| 5,432,817 | 7/1995 | Hormel | 375/257 |
| 5,434,477 | 7/1995 | Crouse et al. | 315/209 R |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 |
| 5,515,433 | 5/1996 | Chen | 379/398 |
| 5,563,479 | 10/1996 | Suzuki | 318/139 |
| 5,574,335 | 11/1996 | Sun | 315/119 |
| 5,579,197 | 11/1996 | Mengelt et al. | 361/93 |
| 5,583,402 | 12/1996 | Moisin | 315/307 |
| 5,608,295 | 3/1997 | Moisin | 315/247 |
| 5,608,595 | 3/1997 | Gourab et al. | 361/79 |
| 5,638,266 | 6/1997 | Horie et al. | 363/132 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,883,797 | * 3/1999 | Amaro et al. | 363/65 |
| 6,008,589 | * 12/1999 | Deng et al. | 315/209 R |
| 6,020,688 | 2/2000 | Moisin | 315/209 R |

* cited by examiner

CONVERTER/INVERTER FULL BRIDGE BALLAST CIRCUIT

RELATED APPLICATIONS

This application is a continuation of application Ser. No. 08/948,690 filed Oct. 10, 1997 now U.S. Pat. No. 6,020,688.

FIELD OF THE INVENTION

The present invention relates generally to circuits for driving a load and more particularly to a lighting system circuit.

BACKGROUND OF THE INVENTION

As is known in the art, a light source or lamp generally refers to an electrically powered man made element which produces light having a predetermined color such as white or near white. Light sources may be provided, for example, as incandescent light sources, fluorescent light sources and high-intensity discharge (HID) light sources such as mercury vapor, metal halide, high-pressure sodium and low-pressure sodium light sources.

As is also known, fluorescent and HID light sources are driven by a ballast. A ballast is a device which by means of inductance, capacitance or resistance, singly or in combination, limits a current provided to a light source such as a fluorescent or a HID light source. The ballast provides an amount of current required for proper lamp operation. Also, in some applications, the ballast may provide a required starting voltage and current. In the case of so-called rapid start lamps, the ballast heats a cathode of the lamp prior to providing a strike voltage to the lamp.

As is also known, one type of ballast is a so-called magnetic or inductive ballast. A magnetic ballast refers to any ballast which includes a magnetic element such as a laminated, iron core or an inductor. One problem with magnetic ballasts, however, is that the relatively low frequency drive signal which they provide results in a relatively inefficient lighting system. Furthermore, magnetic ballasts tend to incur substantial heat losses which further lowers the efficiency of lighting systems utilizing a low frequency magnetic ballast.

In an attempt to overcome the low efficiency problem caused by the low frequency operating characteristic of magnetic ballasts as well as the inability to operate in an instant-start mode, attempts have been made to replace magnetic ballasts with electronic ballasts. Electronic ballasts energize the lamps with relatively high frequency drive signals and can provide strike voltages which allow instant-start lamp operation. One problem with known electronic ballasts, however, is that they utilize a relatively large number of circuit components which reduces reliability and maintainability of the electronic ballast while increasing cost.

Electronic ballasts generally include a rectifier circuit for converting an alternating current (AC) input signal to a direct current signal (DC) and an inverter circuit to drive the load with an AC signal. The inverter circuit can be a circuit having resonant inductive, capacitive and resistive elements coupled in various parallel and/or series configurations to provide resonant operation of the circuit. Inverter circuits generally include switching elements arranged in a half or full bridge configuration with the switching elements controlled in various ways. For example, U.S. Pat. No. 5,220,247 discloses a conventional half bridge inverter circuit configuration having the switching elements controlled by inductors inductively coupled to the resonant inductive element. Conduction of the switching elements can be controlled with a pulse width modulation circuit as disclosed in U.S. Pat. No. 4,415,839. U.S. Pat. No. 5,434,477 discloses a half bridge inverter circuit coupled to a boost circuit having a switching element in common with the inverter circuit.

One problem associated with known half and full bridge inverter circuits is that during cross conduction, the switching elements effectively short circuit positive and negative rails of a power supply. The power supply can include a rectifier circuit. It will be appreciated that circuit components can be severely damaged in a short amount of time in the presence of such a short circuit. Even if cross conduction of multiple switching elements is prevented from a circuit operation standpoint, transients, electromagnetic interference (EMI) pulses, and other such events can result in cross conduction of switching elements. Furthermore, cross conduction prevention and/or protection schemes require additional circuit components thereby adding cost and increasing space requirements.

Another disadvantage associated with known electronic and magnetic ballast circuits is the output isolation transformer typically used to meet safety requirements. In particular, the load current must be limited, i.e., 43 mA at present, in the event that one end of a lamp is removed from the circuit to protect an operator from severe electrical shock. The isolation transformer is bulky and presents a significant cost in the manufacturing of a ballast.

It would, therefore, be desirable to provide a circuit for driving a load which affords circuit protection during cross conduction of switching elements. It would further be desirable to provide a circuit that affords current limiting protection to a user without an output isolation transformer.

SUMMARY OF THE INVENTION

The present invention provides a circuit for driving a load. Although the load is primarily shown and described as a lamp, and in particular a fluorescent lamp, it is understood that the invention is applicable to a variety of circuits and circuit loads.

In one embodiment, a circuit for driving a load has a full bridge topology with a first bridge portion formed from a first switching element and a first current switch and a second bridge portion formed from a second switching element and a second current switch. First and second inductive elements divide the full bridge into the first and second portions and are effective to limit current during cross conduction of the first and second switching elements.

In one particular embodiment, the full bridge forms a portion of a resonant inverter circuit having resonant circuit elements including a resonant capacitive element, resistive element such as the load, and the first and second inductive elements. The first and second switching elements are biased into their states during to conductive alternate cycles to thus energize the load. In the event that the first and second switching elements conduct simultaneously, i.e., there is cross conduction, the manner in which the first and second inductive elements are coupled to the bridge limits the current to thus prevent the circuit elements from exposure to excessive amounts of current which could damage or destroy the circuit elements.

In another embodiment, a circuit for driving a load includes first and second converter circuits for receiving signal voltages at a first voltage level and providing signal voltages at a second higher voltage level to a power circuit, such as an inverter circuit. In one particular embodiment, the first converter circuit includes a first switching element that forms a portion of the inverter circuit and the second converter circuit includes a second switching element that also forms a portion of the inverter circuit. A capacitive element forms a portion of the first and second converter circuits for charging and discharging by the converter circuits during resonant cycles.

In a further embodiment, a common mode ground fault protection circuit includes a common mode inductive element for inductive coupling with an inductive element of an AC filter and a control circuit. The common mode inductive element detects common mode energy generated by a disruption in load return current. The control circuit provides an output signal to the power circuit to limit current to the load and thereby provide ground fault protection.

The detected common mode energy, i.e., longitudinal current, can be generated by a disruption in load return current, such as by load return current finding a path to earth ground other than the circuit path. One such path is through a technician in contact with the energized load, i.e., electrical shock. The common mode inductive element detects the current path disruption as a common mode voltage drop and the control circuit provides a signal to the power circuit to limit current to the load.

BRIEF DESCRIPTION OF THE DRAWINGS

The foregoing features of this invention as well as the invention itself may be more fully understood from the following detailed description of the drawings in which.

DETAILED DESCRIPTION OF THE PREFERRED EMBODIMENT

The present invention provides a circuit for driving a load, such as a ballast circuit for energizing a fluorescent lamp. Although the invention is described in conjunction with a ballast circuit having an inverter circuit, other applications and circuit modifications will be readily apparent to one of ordinary skill in the art. It is thus understood that the invention is applicable to a variety of circuits and loads.

Figure 1:
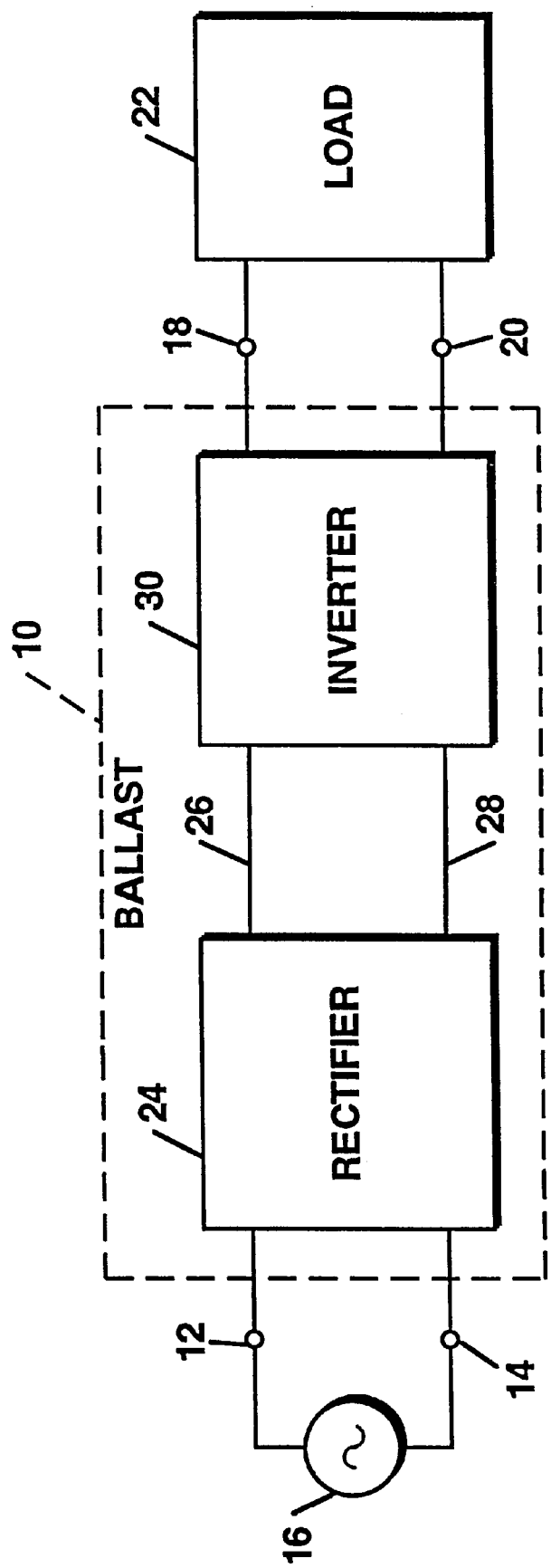
FIG. 1 is a block diagram of a ballast circuit in accordance with the present invention.

FIG. 1 shows a ballast circuit 10 having first and second inputs 12, 14 coupled to an alternating current (AC) power source 16 and first and second outputs 18, 20 coupled to a load 22. The ballast 10 includes a rectifier circuit 24 to provide a direct current (DC) positive rail 26 and a negative rail 28. The rectifier circuit 24 is coupled to an inverter circuit 30 which provides AC energy at the first and second outputs 18, 20 thereby energizing the load 22, which can be a fluorescent lamp.

Figure 2:
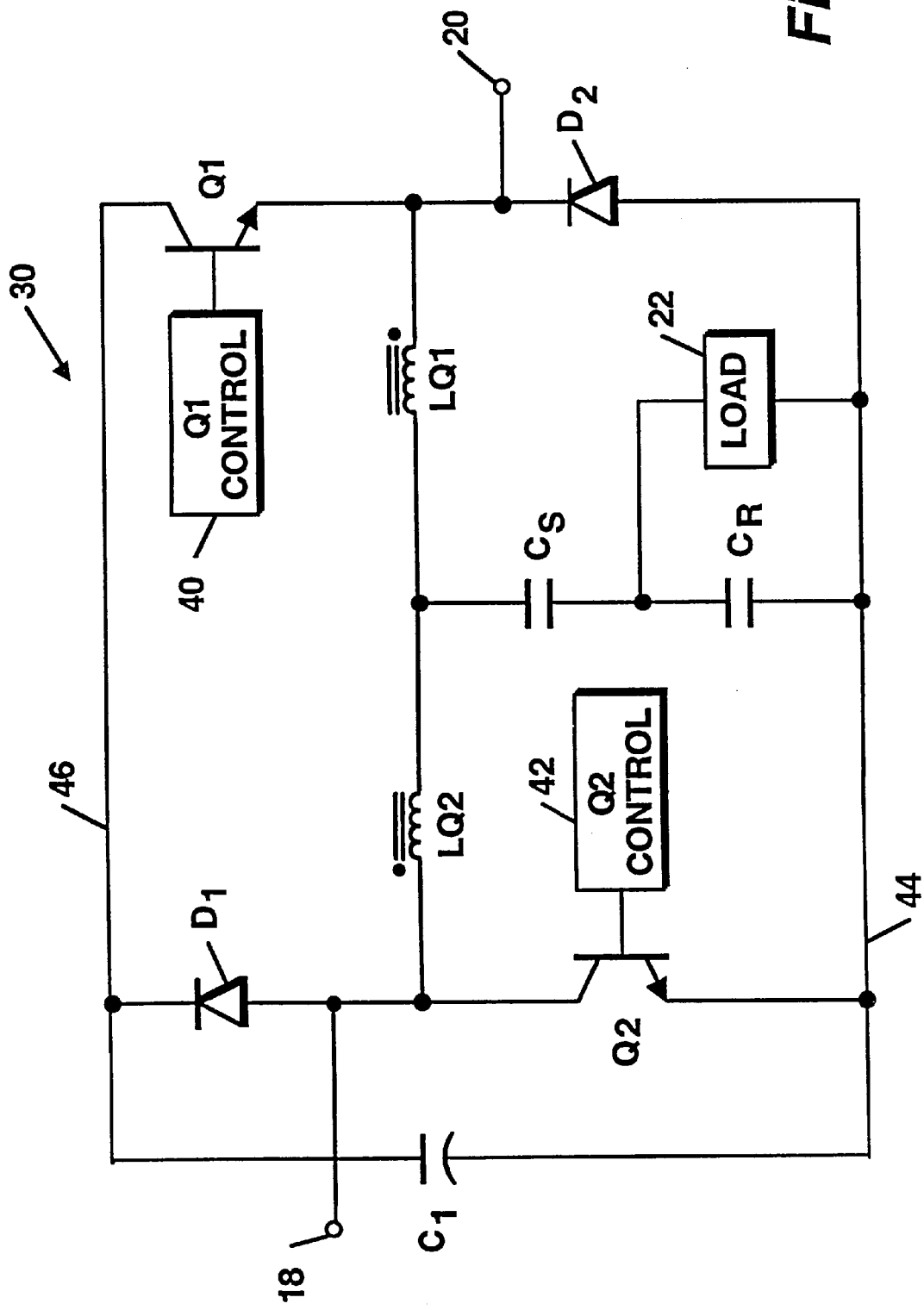
FIG. 2 is a schematic diagram of the ballast circuit of FIG. 1.

FIG. 2 shows an exemplary embodiment of the inverter circuit 30 of FIG. 1, wherein like elements have like reference numbers. As is understood in the art, the inverter circuit 30 receives DC power, i.e., from a rectifier, and outputs AC energy for energizing the load. In the exemplary embodiment, the inverter circuit 30 is a self-resonating circuit providing an AC drive signal to the load 22. The inverter circuit 30 has resonant circuit elements including inductively coupled (i.e., on the same core) inductive elements LQ1 and LQ2, DC blocking capacitor CS, resonant capacitor CR, and the load 22, as shown.

The inverter circuit 30 has a full bridge topology with a first bridge portion formed from diode D1 and switching element Q1 and a second bridge portion formed from diode D2 and switching element Q2. The switching elements Q1, Q2 can be provided as bipolar junction transistors (BJTs) or field effect transistors (FETs) transistors. The conduction state of transistor Q1 is controlled by a Q1 control circuit 40 and the conduction state of transistor Q2 is controlled by a Q2 control circuit 42, as discussed below.

The bridge, 43, formed from diodes D1, D2 and switching elements Q1, Q2, is divided into the first and second portions by consecutively connected inductors LQ1 and LQ2. Connected between inductors LQ1, LQ2 is the DC blocking capacitor CS coupled in series with parallel connected capacitor CR and load 22. A capacitor C1 is coupled across the bridge as shown which charges and discharges energy as the circuit operates by providing an AC current path.

Circuit resonance is initiated as the switching element Q2 is biased into its conduction state. Circuit start-up and control of the switching elements is discussed below. As Q2 becomes conductive, stored capacitive energy in CS in the form of current flows through inductor LQ2 and switching element Q2 to a negative of rail 44 of inverter 30. Since the circuit 30 operates in resonance, after a time the current will reverse direction. Switching element Q2 is biased into its non-conduction state so that the voltage drop across inductor LQ2 reverses thereby biasing diode D1 into conduction so that current flows to capacitor C1. Diode D2 is also biased into conduction so that stored energy is damped in the load 22.

Q1 then becomes conductive so that current flows from a positive inverter rail 46 through switching element Q1, inductor LQ1, capacitors CS, CR, and the load 22 to the negative rail 44. After a time determined by the resonant frequency of the circuit, switching element Q1 switches to its nonconductive state and the stored energy is damped in the load 22 through diode D2 and current flows to capacitor C1. Diode D1 also becomes conductive as the stored inductive energy discharges.

The inverter circuit 30 operates in a repeating sequence of steps as shown in Table 1.

TABLE 1

| Step # | State of Q2 | State of D1 | State of Q1 | State of D2 |
|---|---|---|---|---|
| 1 | ON | OFF | OFF | OFF |
| 2 | OFF | ON | OFF | ON |
| 3 | OFF | OFF | ON | OFF |
| 4 | OFF | ON | OFF | ON |

The switching elements Q1 and Q2 should not be conductive at the same time, i.e., cross conduct, since the positive and negative rails 46, 44 would be effectively connected through inductors LQ1 and LQ2. In addition, after either of switching elements Q1 or Q2 are biased into their non-conduction states (i.e., are turned off), the other switching element should not become conductive until the transistor has fully discharged. However, during the time that switching elements Q1 and Q2 are both off, it is important that current be provided a path to flow. Otherwise, the stored energy will flow to parasitic capacitive elements and resonate at high frequencies to create destructively high voltages, thus damaging circuit elements. As has been described, during the time that switching elements Q1 and Q2 are off there is a current path through diodes D1 and D2 and energy is also advantageously damped in the load 22.

As described below, switching elements Q1 and Q2 are controlled to prevent cross conduction, but transients or noise can produce simultaneous current flow through the switching elements Q1, Q2. The inductors LQ1, LQ2 coupled across the bridge provide protection in the event that cross conduction of switching elements Q1, Q2 occurs. Where switching elements Q1, Q2 are provided as BJTs and are simultaneously conductive, current flows from an emitter of transistor Q1 through inductor LQ1, LQ2, to the collector of transistor Q2 to the negative rail 44. Examining the winding polarities of inductors LQ1 and LQ2 as indicated by the dot notation, the flux generated by each of the inductive elements cancels the other. For an ideal inductor, a short circuit is created. However, as the inductors LQ1, LQ2 are real and not ideal inductors, they have an associated parasitic DC resistance that is effective to limit the current flow therethrough.

In addition to providing a resistance, inductors LQ1 and LQ2 also limit the current via the leakage inductance therebetween. That is, the respective windings of the inductive elements can be separated by a gap to provide a controlled leakage inductance to further limit the current. Thus, during cross conduction of switching elements Q1 and Q2, inductors LQ1 and LQ2 provide a current limiting effect in the form of resistance and leakage inductance.

Figure 3:
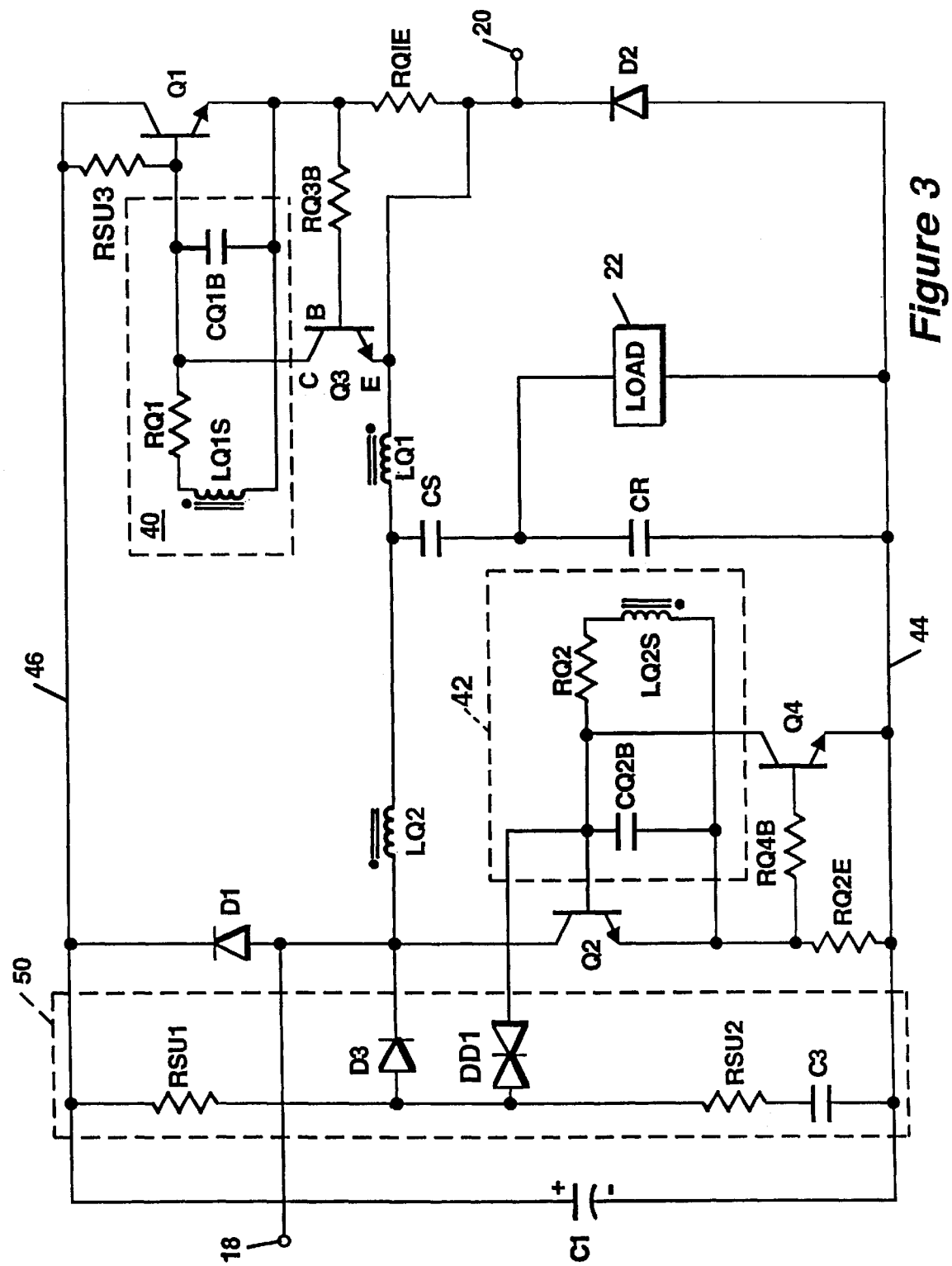
FIG. 3 is a schematic diagram showing the ballast circuit of FIG. 1 in further detail.

FIG. 3 shows further details of inverter circuit 30 of FIG. 2 including exemplary embodiments for the switching elements Q1, Q2, control circuits 40, 42, a start up circuit 50, and current limiting circuits formed from switching elements Q3, Q4.

The start-up circuit 50 includes resistors RSU1, RSU2, diode D3, diac DD1 and capacitor C3. An additional resistor RSU3 can be coupled to the base of Q2 to facilitate charging of circuit elements such as capacitor CS. As power is applied to the circuit, the circuit elements energize and the voltage at capacitor C3 increases to eventually cause conduction of diac DD1 and thereby turn on transistor Q2 to begin circuit resonance.

Now considering switching element control, an exemplary embodiment for the Q1 control circuit 40 includes an RC network provided from resistor RQ1 and capacitor CQ1B coupled as shown, and a control element in the form of an inductor LQ1S inductively coupled with inductors LQ1 and/or LQ2. Looking to the winding polarities (i.e., the dot notations) of inductive elements LQ1 and LQ1S it can be seen that as switching element Q1 conducts a current though inductor LQ1 there is a positive voltage drop across inductors LQ1 and LQ1S. Thus, in the case where switching element Q1 is provided as a BJT, as Q1 current flows through LQ1, LQ1S provides a positive voltage at the base of transistor Q1 biasing transistor Q1 into its conduction state. Similarly, as the current naturally reverses direction due to resonance, the LQ1S voltage drop reverses to cause transistor Q1 to turn off.

Looking to the RC network coupled to the base of Q1, the RC network provides a delay time that corresponds to the time required for Q2 to discharge after turning off. Thus, the positive voltage drop across LQ1S does not turn Q1 on until Q2 has fully discharged.

The Q2 control circuit 42 is similar to that of the Q1 control circuit 40 and includes an RC network of RQ2 and CQ2B and a control element in the form of inductive element LQ2S coupled to the base of Q2. LQ2S is inductively coupled to LQ1 and/or LQ2. The RC network provides a delay longer than the time required for Q1 to fully discharge. Thus, the delay prevents the LQ2S voltage drop from immediately turning on Q2 after Q1 turns off.

Looking again to the winding polarities of LQ1S and LQ2S in conjunction with LQ1 and LQ2, the Q1 and Q2 control circuits 40,42 tend to avoid cross conduction of Q1 and Q2. As a positive voltage drop across LQ1S turns Q1 on, a negative voltage drop across LQ2S appears at the base of Q2 to bias Q2 to the non-conduction state. Similarly, as LQ2S turns Q2 on Q1 is turned off by LQ1S.

The switching elements Q3 and Q4 provide a means to limit the current through respective switching elements Q1 and Q2. Coupled to the base of Q1 is the collector C of Q3 with the base B of Q3 coupled to the emitter of Q1 through resistor RQ3B. A resistor RQ1E is coupled at a first terminal to the emitter of Q1 and the emitter of Q3 at the other terminal as shown.

When the current through Q1 and RQ1E is sufficient to overcome the Q3 base to emitter voltage drop, Q3 effectively turns Q1 off and prevents current flow. Q1 remains turned oft until the current through Q3 is less than a predetermined level.

The network of Q4, RQ4B, and RQ2E are coupled in a manner as described above in conjunction with Q3. Q4 is effective to limit current through Q2 to a predetermined level. It is understood that the current through Q1 and Q2 can be limited to the same or a different amount. It is further understood that one of ordinary skill in the art can readily modify the disclosed circuit to select a desired limiting current level.

Figure 4:
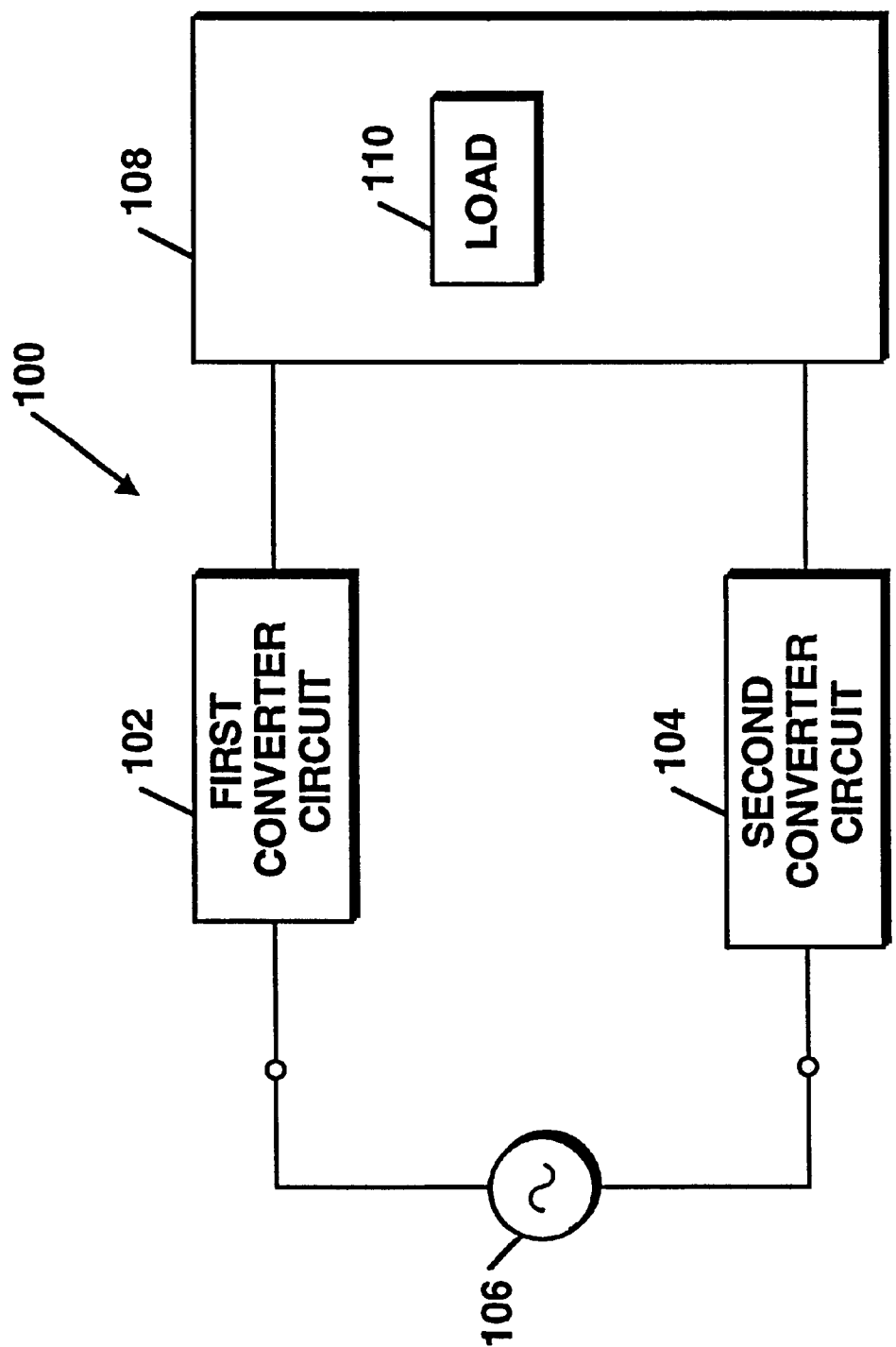
FIG. 4 is block diagram of a circuit for driving a load in accordance with the present invention.

Referring now to FIG. 4, a circuit 100 for driving a load in accordance with the present invention is shown. The circuit 100 includes a first converter circuit 102 and a second converter circuit 104 coupled to an AC power source 106 as shown. The first and second converter circuits 102,104 are coupled to a circuit 108 including a load 110. As is known to one of ordinary skill in the art, the converter circuits provide power factor (PF) correction and total harmonic distortion (THD) correction. Although the converter circuits are described below in conjunction with a ballast circuit for driving a lamp load, it is understood that the dual converter configuration of the present invention is applicable to a variety of circuits that will be readily apparent to one of ordinary skill in the art.

Figure 5:
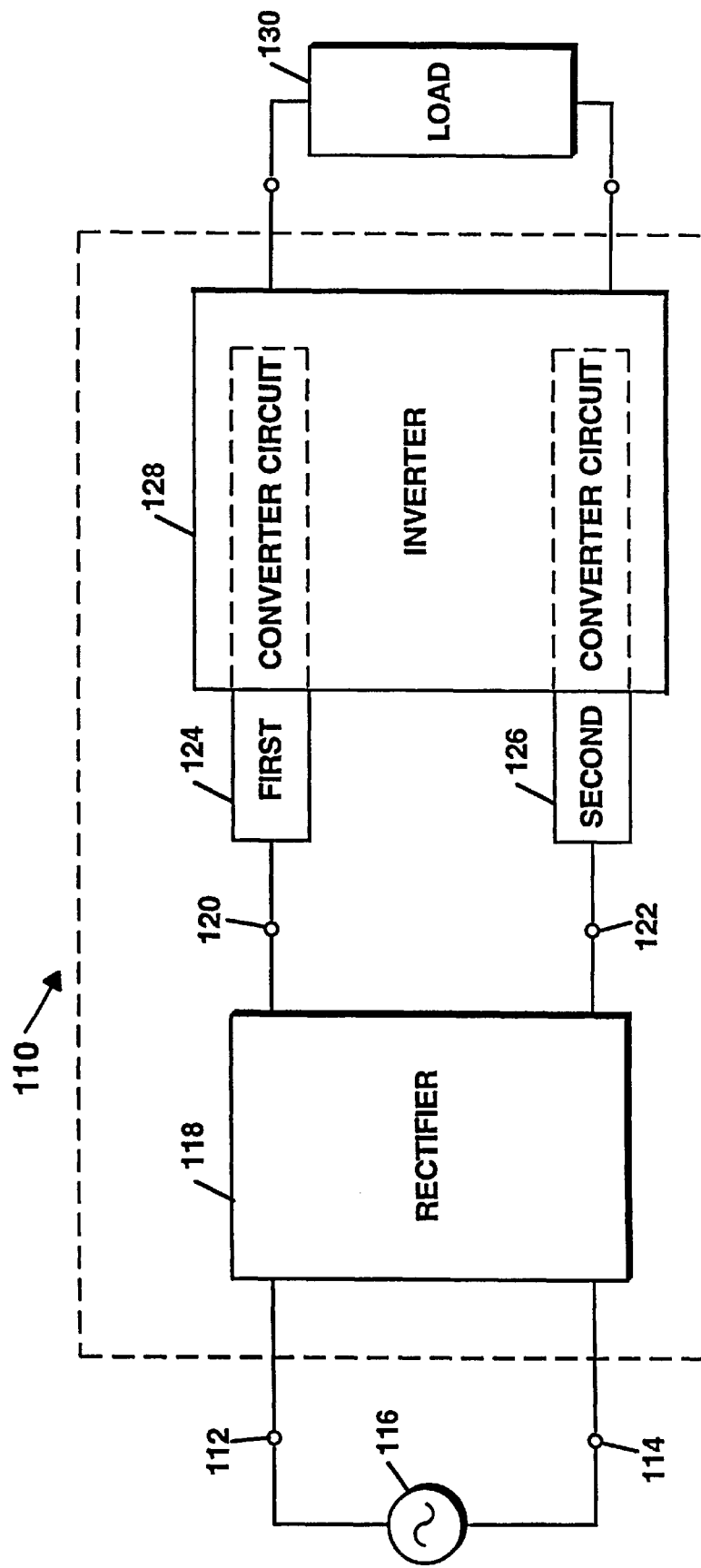
FIG. 5 is a block diagram showing the circuit of FIG. 4 in further detail.

FIG. 5 shows one particular embodiment of a circuit for driving a load including a ballast circuit 110 having first and second terminals 112,114 coupled to an AC power source 116. The ballast circuit 110 includes a rectifier circuit 118 receiving the AC energy and providing DC positive and negative rails 120,122. The positive rail 120 is coupled to a first converter circuit 124 and the negative rail 122 is coupled to a second converter circuit 126. The first and second converter circuits 124,126 are coupled to and form portions of an inverter circuit 128 for energizing a load 130 with AC energy.

Figure 6:
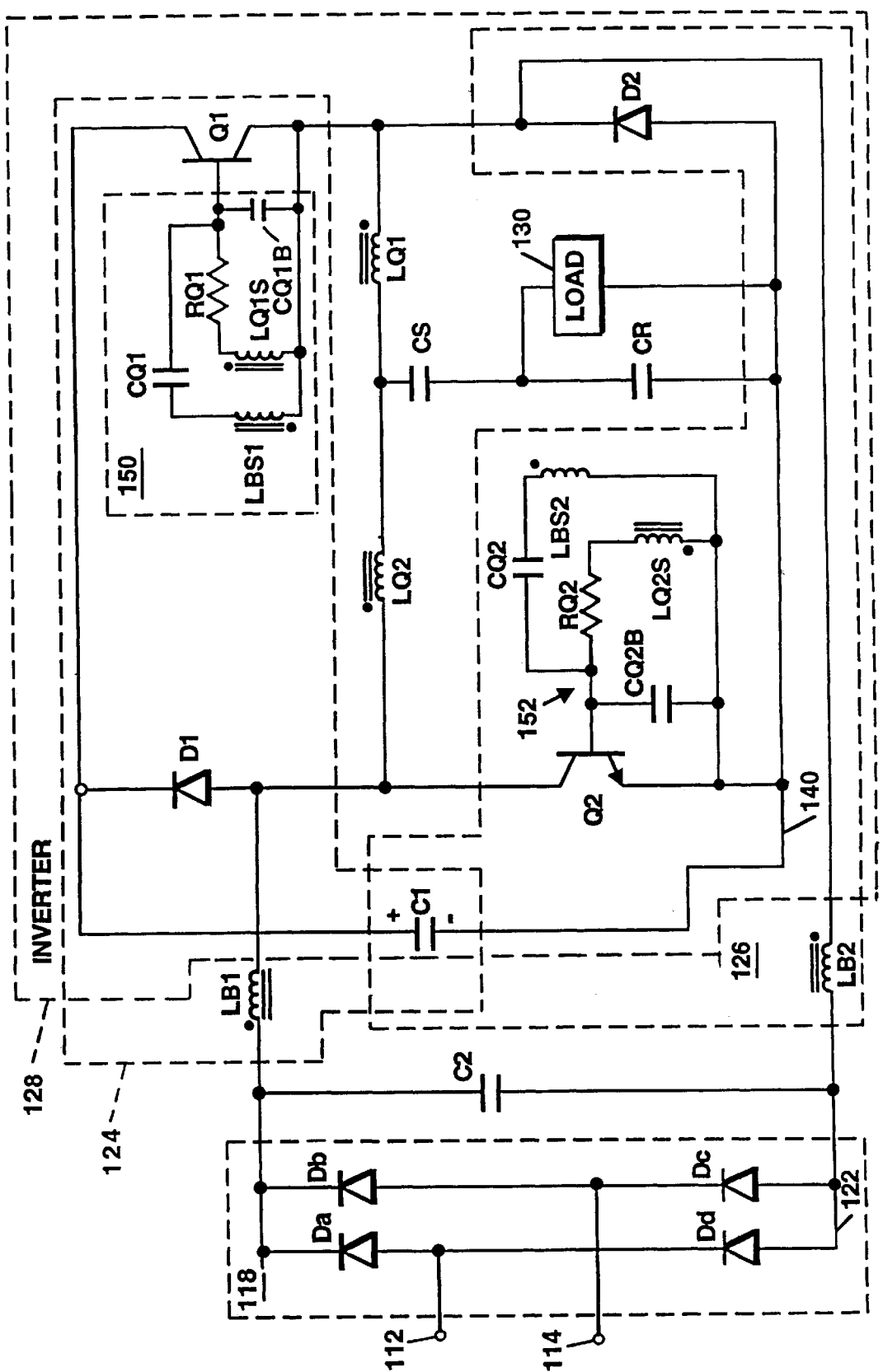
FIG. 6 is a schematic diagram of the circuit of FIG. 5.

FIG. 6 shows an exemplary embodiment of the ballast circuit 100. The rectifier circuit 118 is formed from diodes Da-Dd as shown to provide a conventional bridge rectifier with positive rail 120 and negative rail 122. A capacitor C2 can be coupled across the positive and negative rails 120,122 to filter the signal.

The first converter circuit 124 includes a first converter inductor LB1, diode D1, switching element Q1 and capacitor C1. LB1 has a first terminal coupled to the positive rail 120 and a second terminal coupled to diode D1 as shown. The second converter circuit 126 includes a second converter inductor LB2, diode D2, switching element Q2 and capacitor C1. In the exemplary embodiment, LB1 and LB2 are loosely inductively coupled to provide circuit control as discussed below, but can be independent elements. It is understood that the dual converter circuit configuration is described in conjunction with a circuit similar to that shown and described in FIG. 3 to facilitate an understanding of the invention. Thus, the dual converter configuration is not to be limited to the particular embodiments shown and described herein. Furthermore, operation of the inverter circuit 128 is described in detail above in conjunction with FIG. 3, and therefore, is not repeated here.

In the exemplary embodiment, the first converter circuit 124 and the inverter circuit 128 have circuit elements in common, including Q1, D1 and C1. The second converter circuit 126 and the inverter circuit 128 have Q2, D2 and C1 in common. Thus, while dual converter circuits 124,126 provide converter circuit benefits, few additional circuit components, i.e., LB1 and LB2 are added to the inverter circuit.

As described above, the inverter circuit 128 resonates so that current periodically reverses direction through the load. First consider the circuit 128 with Q2 in a conductive state. Current flows from the positive rail 120 of the rectifier circuit through LB1 and Q2 to a negative rail 140 of the inverter circuit 128. As Q2 turns off, D1 and D2 become conductive to provide a current path to C1 and the negative rail 140 of the inverter until Q1 turns on. Similarly, current flows though LB2 as Q1 conducts and D1 and D2 conduct between the time that Q1 turns off and Q2 turns on.

Contrary to known converter circuits where the converter inductor and capacitor charge and discharge on alternate resonant cycles, the first and second converter inductors LB1, LB2 and capacitor C1 charge and discharge during each resonant cycle to provide efficient circuit operation.

The first and second converter circuits 124, 126 provide further advantages as well. In addition to the elements comprising the Q1 control circuit 40 of FIG. 3, Q1 control circuit 150 further includes inductive element LBS1 coupled in parallel with LQ1S. Similarly, Q2 control circuit 152 includes LBS2. Examining the dot notation shows that as Q2 conducts, the voltage drop across LBS2 biases Q2 on and LBS1 biases Q1 off. When current reverses direction and Q1 conducts, LBS2 biases Q2 off and LBS1 biases Q1 on. Thus, LB1 and LB2 provide a more efficient switching of Q1 and Q2. Furthermore, it is understood that LBS1 and LBS2, without LQ1S and LQ2S, can control Q1 and Q2 switching and vice-versa.

Figure 6A:
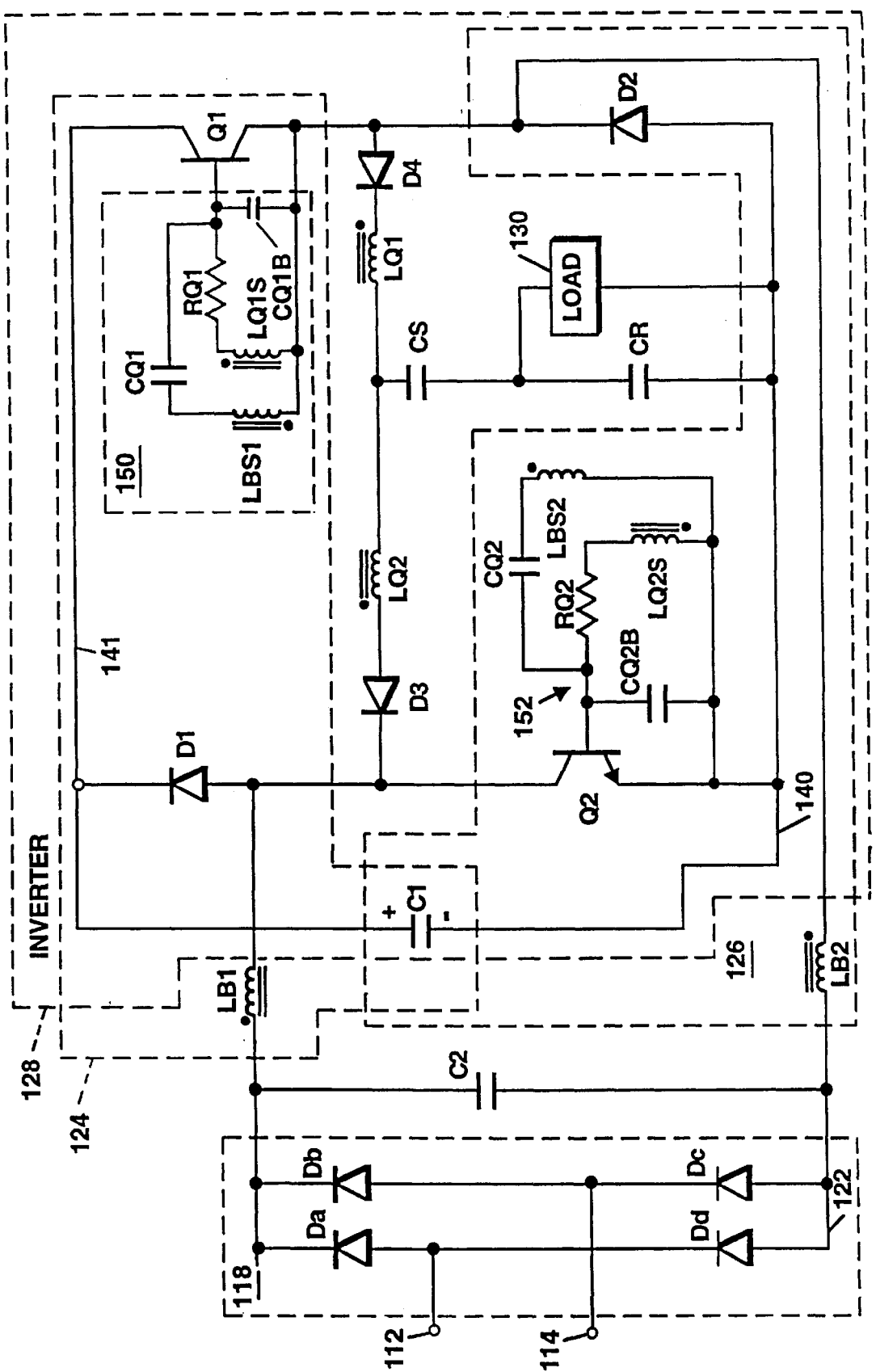
FIG. 6A is a schematic diagram of an alternative embodiment of the circuit of FIG. 6.

FIG. 6A shows an alternative embodiment of the circuit of FIG. 6 further including diode D3 and diode D4. Diode D3 has an anode coupled to inductor LQ2 and cathode coupled to the bridge between the collector of Q2 and D1. Diode D4 has an anode coupled to the bridge at a point between diode D2 and the emitter of Q1.

Diode D3 is effective to prevent the flow of current from LB1 to LQ2. Without the diode D3, current may flow into LQ2 while Q2 is off and the voltage at the positive rail 141 of the inverter is present at the collector of Q2. Similarly, D4 prevents current flow from LB2 to LQ1 thereby eliminating parasitic circuit effects from such a current. It is understood that inductors LB1 and LB2 can have a relatively loose inductive coupling to provide an energy release path when Q2 and Q1 respectively terminate conduction. The diodes D3 and D4 provide enhanced circuit control and more clearly define the alternating Q1, Q2 conduction cycles.

Figure 6B:
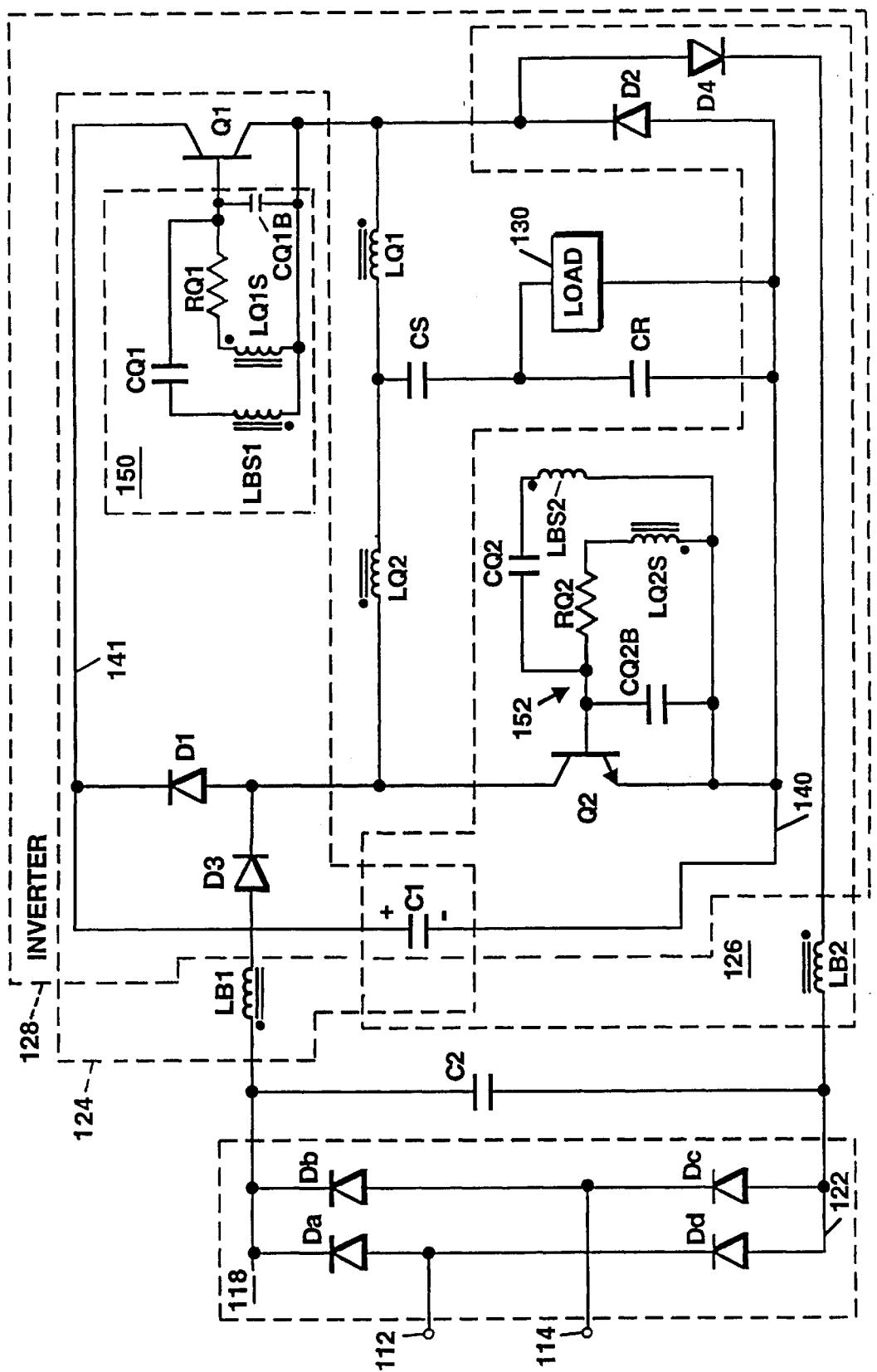
FIG. 6B is schematic diagram of a further alternative embodiment of the circuit of FIG. 6.

FIG. 6B shown another embodiment of FIG. 6 with diode D3 coupled between inductor LB1 and the bridge and diode D4 coupled between the bridge and inductor LB2. As described above, diodes D3 and D4 prevent current flow to inductors LQ2 and LQ1 respectively after the switching elements Q1, Q2 are biased to the non-conduction state.

Figure 7:
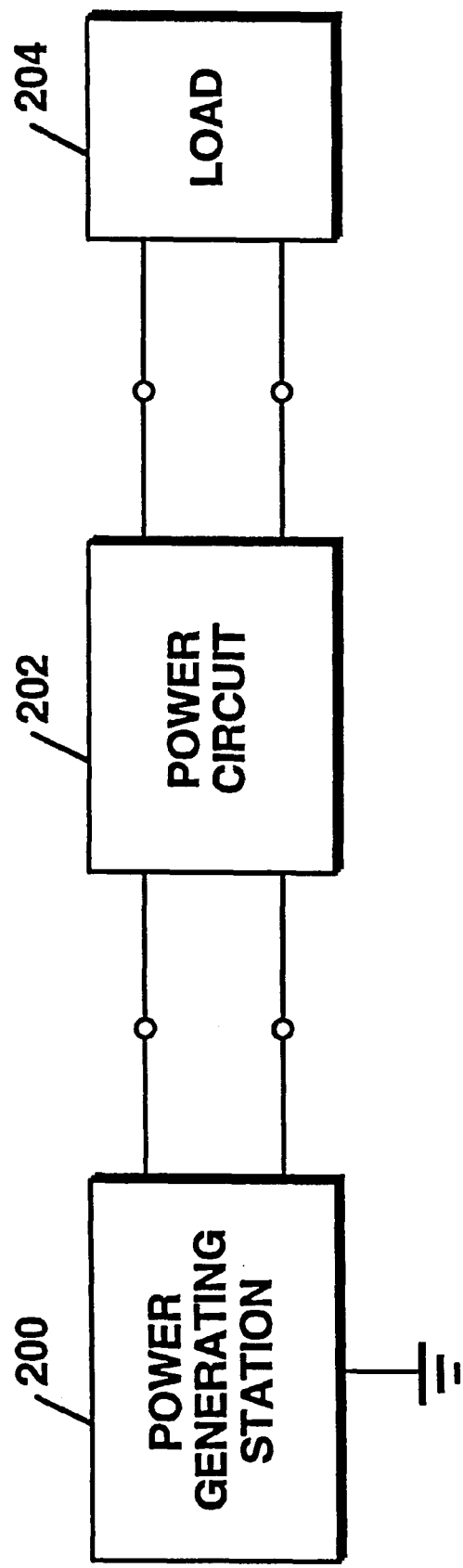
FIG. 7 is block diagram of a circuit for providing ground fault protection in accordance with the present invention.

Referring now to FIGS. 7–10, there is shown a ground fault protection circuit in accordance with the present invention. FIG. 7 shows a power generating station 200 providing AC power to a power circuit 202 for driving a load 204. The power generating station 200 can be a regional substation for generating electricity for consumer use.

Figure 8:
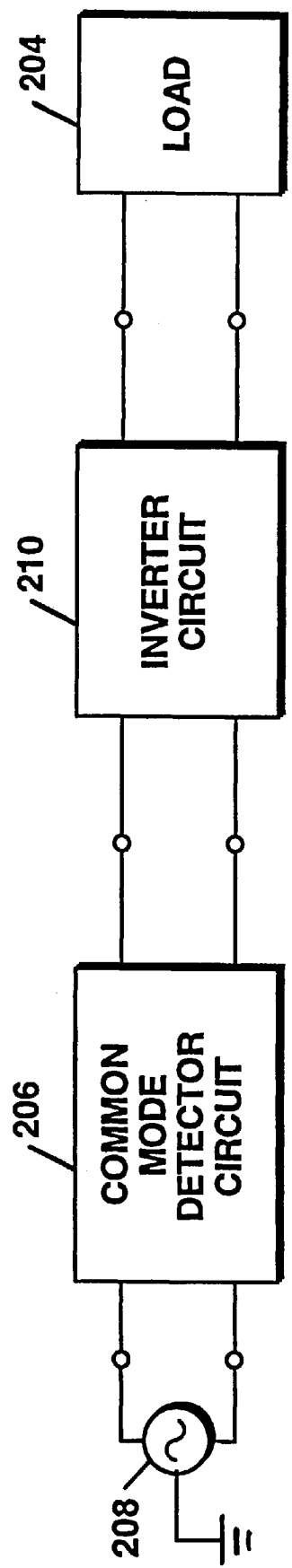
FIG. 8 is a block diagram of the circuit of FIG. 7 shown in further detail.

FIG. 8 shows a common mode detector circuit 206 coupled to an AC energy source 208, such as power generating station 200. The common mode detector circuit 206 is coupled to an inverter circuit 210, such as the inverter circuits described above, for energizing the load 204. The load can be one or more fluorescent lamps.

Figure 9:
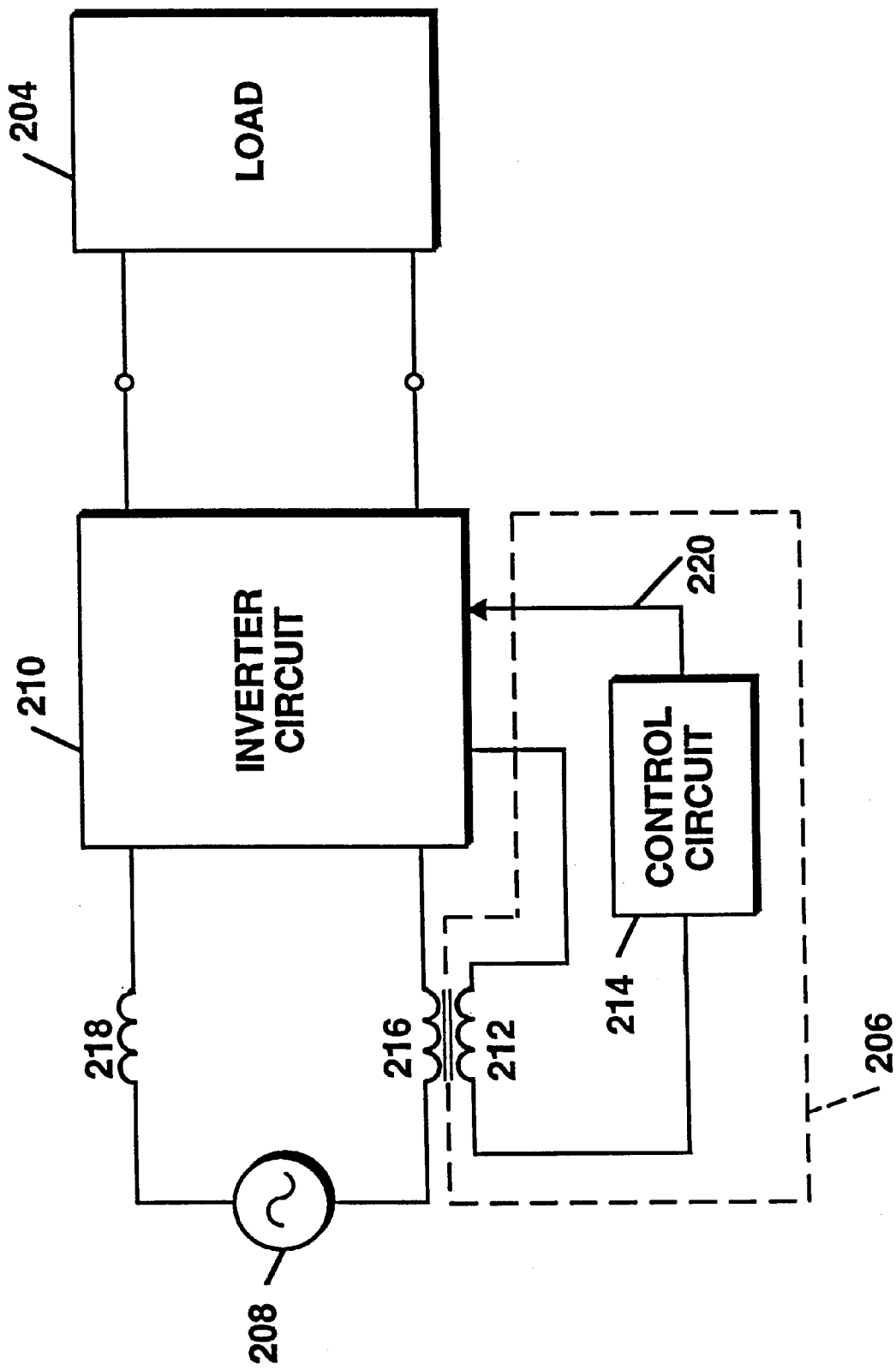
FIG. 9 is a schematic diagram of the circuit of FIG. 8.

FIG. 9 shows an exemplary embodiment of the common mode detector circuit 206 including a common mode inductor 212 and control circuit 214 coupled to the inverter circuit 210 which drives the load 204. The AC power source 208 is coupled to the inverter circuit 210 through first and second common mode inductive elements 216,218 for power factor correction and EMI control.

The inductive element 212 is inductively coupled with the first and second common mode inductive elements 216,218 for detecting common mode energy from the AC power source 208. Common mode energy appears as a voltage drop across the inductive element 212. As the control circuit 214 detects the common mode voltage drop an output signal 220 to the inverter circuit 210 is activated for limiting the current to the load 204.

Figure 10:
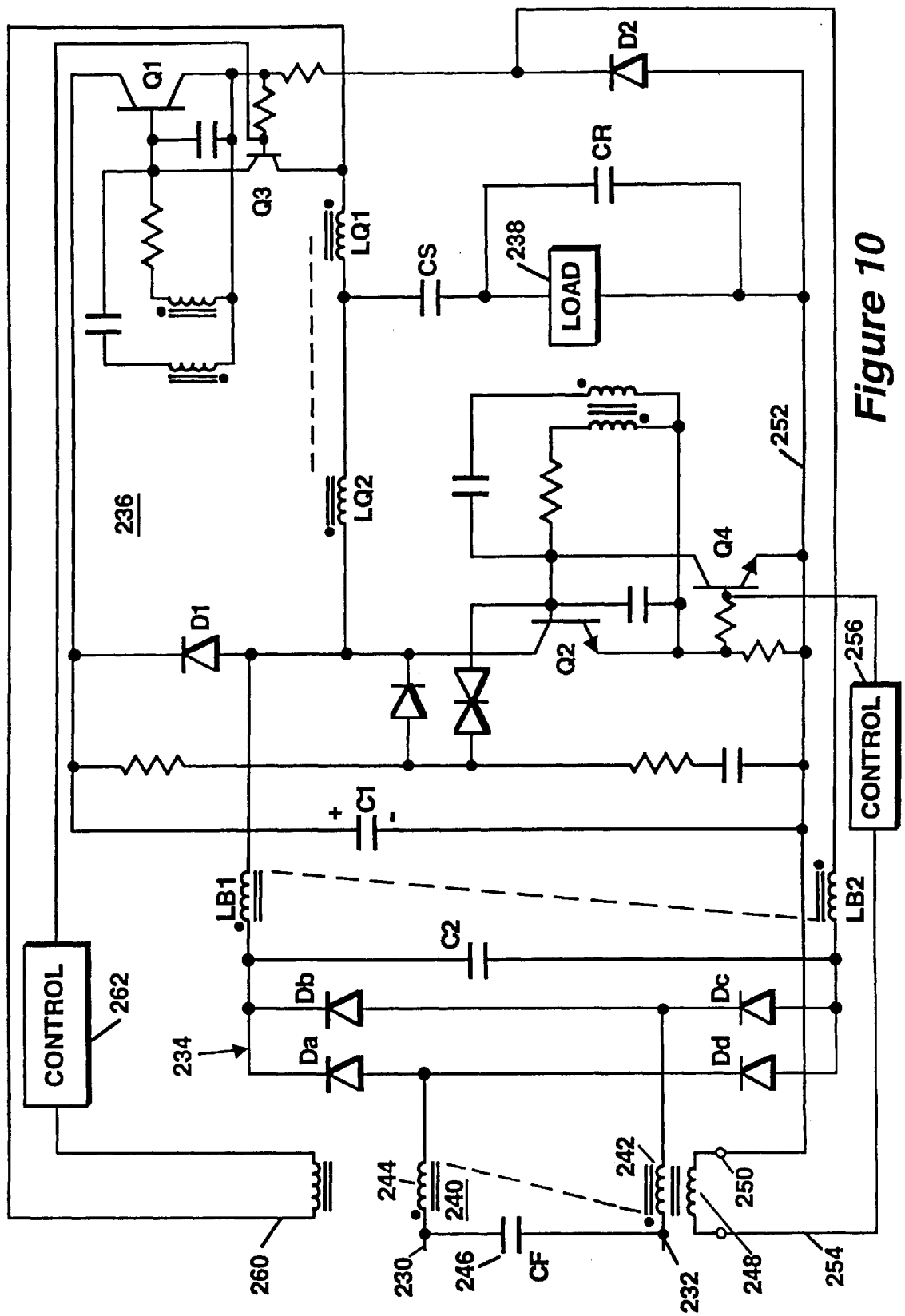
FIG. 10 is a schematic diagram of the circuit of FIG. 9.

FIG. 10 is an exemplary embodiment of a common mode ground fault protection (CMGFP) scheme in accordance with the present invention. It is understood that this ground fault protection scheme is described in conjunction with above described inverter circuits to facilitate an understanding of the invention. It is further understood that one of ordinary skill in the art can readily modify the described embodiments for other applications of the ground fault circuit of the present invention and fall within the scope and spirit of the appended claims.

FIG. 10 shows AC input terminals 230,232 coupled to a rectifier circuit 234 for providing DC power to an inverter circuit 236 to drive load 238. The load 238 can be a fluorescent lamp energized with AC energy by the inverter circuit 236. The inverter circuit 236 operates as described in detail above.

An AC filter 240 comprising inductively coupled first and second common mode inductive elements 242,244 and filter capacitor CF 246 are coupled to the AC power terminals 230,232 as shown. A first inductor 248 is inductively coupled with the first and second common mode inductive filter elements 242,244. A first terminal 250 of the first inductor 248 is connected to a negative rail 252 of the inverter circuit 236, i.e., the load return, and a second terminal 254 is coupled to a control circuit 256. The control circuit 256 provides an output signal to the base of Q4 to selectively disable Q4 and interrupt current flow in the circuit. It is readily apparent that other circuit nodes can be controlled by the control circuit 256 to disable current flow.

An optional second inductor 260 can be inductively coupled with the first and second inductive filter elements 242,244 in a manner similar to that of the first inductor 248. The second inductor 260 is connected to a second control circuit 262 which is coupled to the base of Q3 to selectively disable Q3.

The ground fault protection circuit of the present invention detects a common mode signal and limits current through a load to reduce electrical shock injuries. As is well known in the art, an output isolation transformer is generally used to limit current through the load and thereby provide ground fault protection. More particularly, where an operator removes one end of an energized lamp, the operator can undesirably provide a current path to ground. That is, the operator can suffer an electrical shock that can be fatal with sufficient current flow. Thus, to limit the current, the isolation transformer is used. However, the isolation transformer makes the circuit less efficient, more costly, and less compact.

In some ground fault protection schemes current into and out of a load are monitored and compared. More particularly, the circuit is opened in the event that the load return does not match the input current, i.e., current has found a path to ground other than the circuit return path.

In contrast, the ground fault protection circuit of the present invention detects common mode energy. The detected common mode energy, i.e., longitudinal current, can be generated by a disruption in load return current. The disruption can be constituted by load return current finding a path to earth ground other than the circuit path, such as through a technician in contact with the energized load.

In a typical residential wiring configuration, electrical sockets are connected with a black ("hot") wire, a white return wire , a green earth ground. For an electrical load, current flows to the lamp through the black wire and away from the lamp through the white wire. If the circuit is interrupted, a return current can flow to earth ground through an alternate path. This current flows to earth ground back to the power source, i.e., the power substation. As is known in the art, the white, black and green wires are all connected to earth ground from an AC standpoint. For example, in the power plant there will be a capacitive connection to ground through which a high frequency signal readily passes. This energy, originating from the load current disruption, will flow in parallel along the black and white wires to the load in the form of a common mode, i.e., longitudinal, current. The common mode current that flows to the load closes the circuit loop.

Thus, in the event of a load current disruption, current flows through earth ground to the power source. A common mode current then flows back to the load to close the circuit loop whereby the common mode inductive element 248 detects the common mode current in the form of a voltage drop and the control circuit 256 provides a signal to the power circuit 236 to limit current to the load and thereby provide ground fault protection.

Figure 10A:
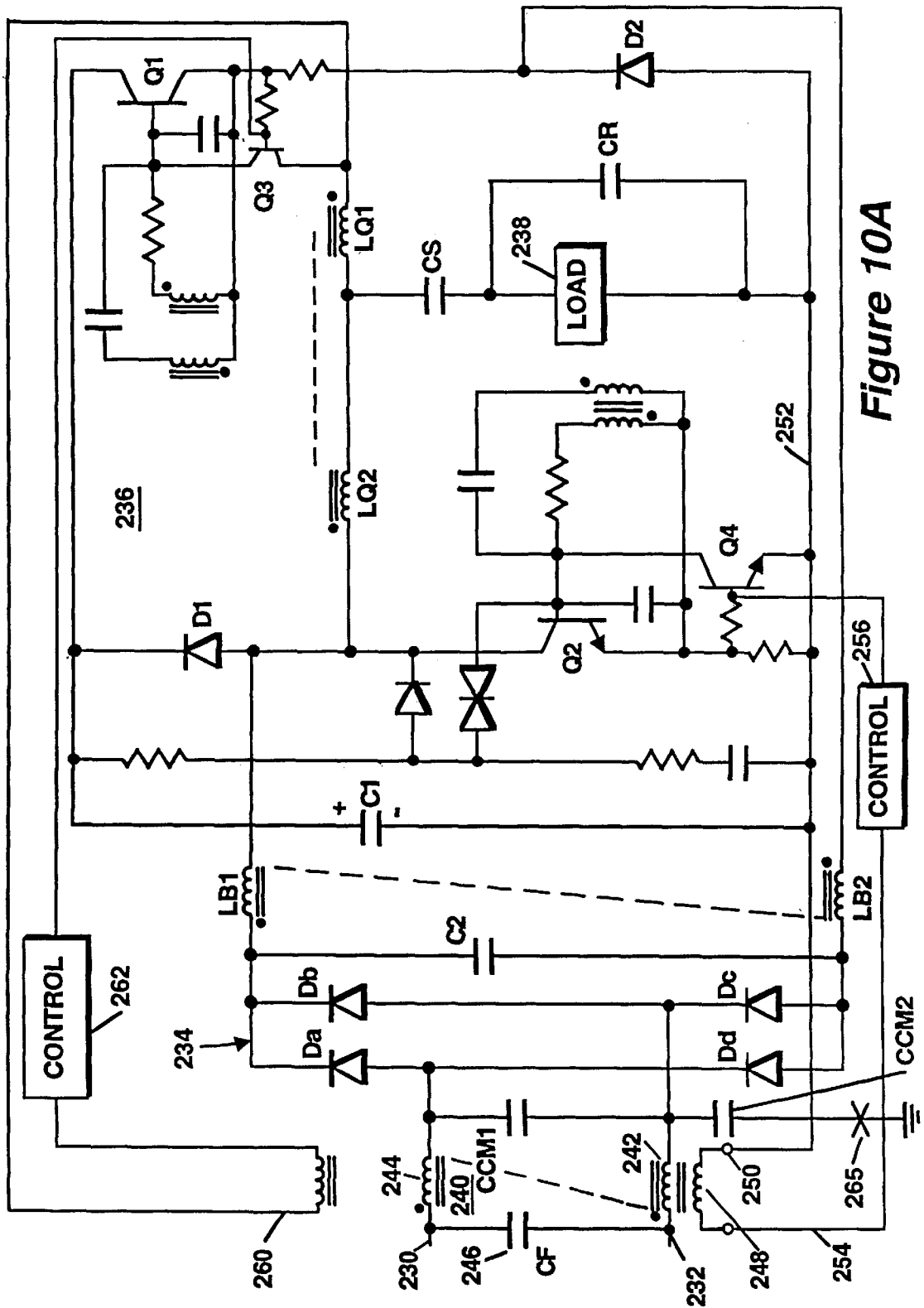
FIG. 10A is a further embodiment of the circuit of FIG. 10.

FIG. 10A shows a further embodiment of the ground fault protection circuit of FIG. 10 where like reference numbers represent like elements. The circuit includes a first common mode capacitor CCM 1 coupled across the first and second inductive elements 242,244 and a second common mode capacitor CCM2 connecting the capacitor CCM1 to ground as shown.

The capacitors CCM1 and CCM2 provide an AC signal path to ground and provide EMI filtering for longitudinal currents generated by the ballast flowing to the supply lines. As is well known in the art, standard electrical wiring provides that each electrical outlet box be connected to ground to prevent electrical shock. The ground connection is generally not necessary for operation of electrical devices. However, where a ground connection for the box is broken or missing, a safety hazard exists that is not readily detectable. That is, the box can be energized and shock a user upon contact with the box.

Consider break in the connection to ground at point 265. The break at point 265 eliminates the AC path to ground so that a common mode signal generated by the ballast is detected as a voltage drop across the inductive element 248. As described above, the control circuit 256 can shut down operation of the circuit and/or provide a warning signal.

The common mode capacitors CCM1 and CCM2 also provide the inductor element 248 with better sensitivity to incoming common mode energy by eliminating the common mode signal generated by the ballast circuit before it reaches the inductor element 248.

In other embodiments, the control circuit 256 includes an audible or visible alarm to provide at warning that a hazardous condition exists. The warning signal can be sent along the supply lines. In a further embodiment, a warning signal may flow to a central station to alert a security guard or other interested parties. The warning signal can be sent as a high frequency signal through the power supply lines.

Having described preferred embodiments of the invention, it will now become apparent to one of skill in the art that other embodiments incorporating the concepts may be used. Thus, the invention is not be limited to the particular embodiments disclosed herein, but rather only by the spirit and scope of the appended claims.

What is claimed is:

1. A circuit for driving a load, comprising:
    a first converter circuit for coupling to a power circuit including a first switching element and a first converter inductive element, wherein the first switching element forms a portion of the power circuit; and
    a second converter circuit for coupling to the power circuit including a second switching element and a second converter inductive element, wherein the second switching element forms a portion of the power circuit.

2. The circuit of claim 1, wherein the first and second converter circuits charge a common charge storage element.

3. The circuit of claim 1, wherein the first converter circuit includes the first converter inductive element, a first current switch, a first capacitive element, and the first switching element.

4. The circuit of claim 1, wherein the power circuit is a resonant inverter circuit.

5. The circuit according to claim 1, wherein the first switching element is controlled by a switch inductor element inductively coupled to the first converter inductor.

6. A circuit for driving a load, comprising:

a first converter circuit for coupling to a power circuit including a first switching element and a first converter inductive element, the first switching element forming a portion of the power circuit, a second converter circuit for coupling to the power circuit including a second switching element and a second converter inductive element, the second element forming a portion of the power circuit, wherein the first converter circuit includes the first converter inductive element, a first current switch, a first capactive element, and the first switching element, and the second converter circuit includes the second converter inductive element, a second current switch, the first capactive element, and the second switching element.

7. A ballast circuit for driving a lamp, comprising:

a pair of terminals for coupling the ballast circuit to a source of ac voltage, a resonant full bridge circuit having a first portion formed from a first switching element and a first diode and a second portion formed from a second switching element and a second diode with first and second inductive elements dividing the bridge into the first and second portions, wherein the load is coupled between the first and second inductive elements;

a capacitive element coupling the first and second portions of the bridge circuit;

a first converter circuit including a first converter inductor, wherein the first switching element forms a portion of the first converter circuit; and a second converter circuit including a second converter inductor, wherein the second switching element forms a portion of the second converter circuit.

8. The circuit according to claim 7, wherein the first and second switching elements are controlled by the first and second converter inductors and/or the first and second inductive elements.

* * * * *